United States Patent Office 2,727,825
Patented Dec. 20, 1955

2,727,825

COLORING COMPOSITION ADAPTED FOR USE IN DUPLICATING INKS

Thomas Gray Webber, Wenonah, N. J., assignor to E. I. du Pont de Nemours & Company, Wilmington, Del., a corporation of Delaware No Drawing. Application February 19, 1952, Serial No. 272,497

7 Claims. (Cl. 106—22)

This invention relates to new spirit-soluble coloring compositions adapted for use in the production of typewriter ribbon, carbon paper or writing fluids intended for use in spirit hectograph duplication processes.

It is an object of this invention to provide coloring compositions for the aforegoing purpose, which are characterized by their brilliance, uniformity of exhaustion, and above all by remarkable freedom from smudging and staining troubles. Additional objects and achievements of this invention will appear as the description proceeds.

The basic dyes commonly used in spirit hectograph inks are well known for their capacity to produce strong and bright copies in hectograph duplication processes; but unfortunately, the easy water-solubility of these dyes causes undesirable smudging and staining. The small amount of moisture on the hands, for example, is sufficient to produce a stain on the skin when the duplication papers are handled.

Another problem associated with duplicating colors is the need for good copy strength, correct shade and uniform exhaust qualities. Copy strength implies the capacity of producing a large number of legible copies from the hectograph pad. Correct shade depends of course on what the consumer desires, but usage has practically standardized the colors acceptable in the trade for hectograph purposes to a limited group of well-known shades, mostly in the region of blue, purple and black. Uniform exhaust qualities imply that when the correct shade has been achieved by mixing two or more dyestuffs, their exhaustion from the hectograph pad shall be substantially uniform, as otherwise the subsequent copies will differ in shade from the earlier copies taken off in the course of continued duplication from the same imprint.

Brilliance of shade, desirable working properties (e. g., ease of incorporation into oils and waxes and low viscosity of the resulting ink), and overall economy of cost are typical additional requirements of a duplicating color.

Often, attempts in the art to solve some of the above problems have resulted in impairment of some of the other desirable qualities. Thus, it has been proposed in the art to eliminate smudging by employing as color salts of basic dyes formed by reacting the same with organic carboxylic acids. It develops, however, that the resulting composition obtained by incorporating such salts in carnauba wax, for instance (as is necessary, to produce a coating for the so-called hectograph carbon paper), has poor copy strength and a short life. In other words, the number of clear, strongly printed copies that can be taken off a single imprint on the hectograph pad is considerably reduced.

Likewise, certain proposals in the patent literature have found various solutions to the problem of uniform exhaust, but the resulting colors are no better from the viewpoint of staining and smudging than the unmodified basic dyes themselves.

Now according to my invention, a novel coloring composition, answering to a satisfactory degree essentially each of the aforegoing requirements, is obtained by compounding a mixture of several basic dyes, each being in the form of a salt of the dye with a naphthalene polysulfonic acid which may also bear OH or $NH_2$ groups. For example, my novel composition may consist of a mixture of crystal violet, methyl violet and victoria blue B, each of these colors being in the form of its salt, say, with 1-naphthylamine-3,8-disulfonic acid.

Such salts may be produced by reacting aqueous solutions of the corresponding dyes and of the selected naphthalene-polysulfonic acids or an alkali-metal salt thereof. For this purpose, each basic dye may be dissolved separately in water and treated with an aqueous slurry or solution of the chosen naphthalene-sulfonic acid compound, and the resulting precipitates may then be mixed mechanically; or all three basic dyes may be dissolved jointly in water and treated with a slurry or solution of the naphthalene-sulfonic acid compound, producing directly a mixed precipitate. Obviously, an intermediate course may also be followed, for instance by co-precipitating the salts of any two of the basic dyes, and mixing the resulting precipitate mechanically with a salt of the third one.

As basic dyes for the purpose of this invention, the following may be taken into consideration:

Crystal violet_____ Colour Index No. 681
Methyl violet_____ Colour Index No. 680
Victoria blue B_____ Colour Index No. 729
Victoria pure blue BO_____ U. S. P. 2,422,445
Rhodamine 6 GDN_____ Colour Index No. 752
Ethyl violet_____ Colour Index No. 682
Rhodamine B_____ Colour Index No. 749
Fuchsine _____ Colour Index No. 677
Safranine _____ Colour Index No. 841
Brilliant green_____ Colour Index No. 662

It will be noted that seven of the colors named in the above table are basic dyes of the triarylmethane type; the fifth and seventh items are xanthenes, while the ninth item is an azine type.

As naphthalene-sulfonic acid compounds for salt formation, any of the following may be selected:

Naphthalene-2,7-disulfonic acid
1-naphthylamine-3,8-disulfonic acid
1-naphthylamine-4,6-disulfonic acid
1-naphthylamine-4,7-disulfonic acid
2-naphthylamine-4,8-disulfonic acid
2-naphthylamine-6,8-disulfonic acid
1-naphthylamine-3,6,8-trisulfonic acid (Koch's acid)
2-naphthylamine-3,6,8-trisulfonic acid (2 R amino acid)
1-naphthol-3,8-disulfonic acid
2-naphthol-3,6-disulfonic acid (R salt)
2-naphthol-6,8-disulfonic acid (G salt)
1,8-dihydroxy naphthalene-3,6-disulfonic acid (chromotropic acid)
1-amino-8-naphthol-2,4-disulfonic acid (Chicago acid)
1-amino-8-naphthol-3,6-disulfonic acid (H acid)
2-amino-8-naphthol-3,6-disulfonic acid (2 R acid)

Inasmuch as the naphthalene compound possesses two or more sulfonic acid groups, one molecule of the naphthalene compound will combine with two or more basic dye molecules. The latter being, usually, in the form of a hydrochloride, the reaction presumably consists of replacing the Cl-atom by the sulfonate radical, splitting off HCl or NaCl, as illustrated by the following typical equation, wherein B.Cl designates the hydrochloride of a basic dye:

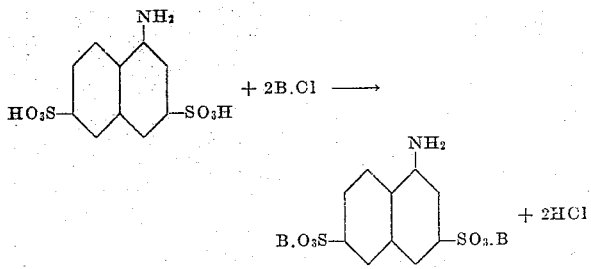

Where several basic dyes are precipitated in admixture, there is a chance for producing mixed molecules; that is, salts of the naphthalene-polysulfonic acid with two or more different basic dyes.

The naphthalene sulfonates of the mentioned basic dyes are essentially water-insoluble, and hence precipitate out, allowing the reaction to go to completion. The precipitates are also sparingly soluble in alcohol, but fortunately I found this limited solubility sufficient to permit the use of the salt in hectograph duplicating compositions, and to obtain thereby strong, brilliant hectograph copies.

According to the aforegoing, theory would require reacting 1 mole of the naphthalene polysulfonic acid with 1 mole of the basic dye for each sulfo-group that the former possesses. I find, however, that when a deficiency of the acid is employed, up to a certain point (say up to a deficiency of 20%), the resulting color is nevertheless remarkably free of smudging and staining troubles. This indicates, that the sulfonate salts formed will protect a certain minor quantity of the walter-soluble chloride from being dissolved out readily by sparing quantities of moisture, for instance the normal perspiration of the fingers. Consequently, the preferred mixtures of this invention may be modified by adding thereto a limited quantity of one or more of the basic dye hydrochlorides, provided the quantity added does not exceed 20% of the weight of total color.

Excessive quantities of the naphthalene sulfonic acid compound may be employed, if desired, inasmuch as the excess will simply remain in solution, and will not affect the qualities of the precipitated color mixture.

Without limiting my invention, the following examples are given to illustrate my preferred mode of operation. Parts mentioned are by weight.

*Example 1*

18.2 parts of victoria blue B (C. I. No. 729; 0.036 mol), 18.5 parts of methyl violet (C. I. No. 680; 0.047 mol), and 62.8 parts of crystal violet (C. I. 681; 0.154 mol) were dissolved in 2250 parts of water at 80°–85° C. This solution was then cooled to 25°–30° C. Meanwhile, 38 parts of H acid (1-amino-8-naphthol-3,6-disulfonic acid; 0.118 mol) were slurried with 325 parts of water. Thus slurry had a pH of 2.3. The dye solution was added to the H acid slurry over a period of 20 to 30 minutes. The precipitated color was filtered off and dried in vacuum at 80–85° C. for 48 hours.

135 parts of the dried color were incorporated with 100 parts of a mixture of waxes and oils, as commonly used in the preparation of hectograph inks, and the mixture was ground on a three-roller ink mill to prepare an ink. This ink was applied to paper by means of a coating machine to prepare carbon paper for spirit hectograph duplication. The ink was found to have suitable viscosity for such a coating. The carbon paper thus made showed very little bleed when tested by placing it under a stream of water having a temperature of 20° to 30° C. The carbon paper gave a master copy which produced copies of good strength by the well-known spirit hectograph method of duplication described in U. S. Patent 2,461,896.

*Example 2*

A precipitated color was prepared as in Example 1 except the pH of the H acid slurry was adjusted to 12.0 by the aid of caustic soda, which resulted in complete solution, before adding the dye solution.

The dried color obtained was tested on carbon paper as described in Example 1. The carbon paper had properties similar to those described for the paper obtained in Example 1.

*Example 3*

A precipitated color was prepared as in Example 1 except that the color was precipitated by adding the H acid slurry to the dye solution. The dried color obtained in this manner was tested on carbon paper as described in Example 1. Similar results were obtained.

*Example 4*

A solution of victoria blue B, methyl violet and crystal violet was made as described in Example 1 and was cooled to 10° C.–15° C. 34.1 parts of naphthalene-2,7-disulfonic acid (0.118 mol) were slurried with 325 parts of water. Caustic soda was added to adjust the pH to 12.1, converting the acid into its water-soluble disodium salt. The dye solution was added to the sulfonate solution thus obtained, during 20–30 minutes at 10–15° C. The precipitated color was isolated by filtration and the filter cake was washed with 2000 parts of water at 20°–30° C. The product was dried in vacuum at 80°–90° C. to a moisture content of less than 1%.

The dried color obtained was tested on carbon paper as described in Example 1. The carbon paper made from this material showed very little color bleed when placed under a stream of water at 20°–30° C. This carbon paper gave a master copy which produced copies of good strength by the spirit hectograph method of duplication.

*Example 5*

A solution of victoria blue B, methyl violet and crystal violet was made as described in Example 1 and was cooled to 10°–15° C. 32 parts of 1-naphthylamine-3,8-disulfonic acid (0.098 mol) was slurried with 150 parts of water and enough caustic soda added to raise the pH to 12.0, forming a clear solution. The dye solution was added to the sulfonate solution during 30 minutes and the temperature was held at 6°–12° C. The precipitated color was isolated by filtration and dried in vacuum at 85°–90° C.

The dried color obtained was tested on carbon paper as described in Example 1. The carbon paper made from this material showed properties similar to that obtained in Example 1.

*Example 6*

A solution of victoria blue B, methyl violet and crystal violet was made as described in Example 1 and was cooled to 10°–15° C. 37.8 parts of R salt (a mixture of 2-naphthol-3,6-disodium sulfonate and the corresponding disulfonic acid) was slurried with 325 parts of water. The dye solution was added to the R salt slurry during 20 to 30 minutes at 10°–15° C. The precipitated color was isolated by filtration and dried in vacuum at 80°–90° C.

The dried color obtained was tested on carbon paper as described in Example 1. The carbon paper made from this product showed very little color bleed when tested by placing under a stream of water having a temperature of 20°–30° C. The carbon paper gave, by spirit hectograph duplication, copies having good strength.

*Example 7*

The procedure was as in Example 6, except that 28.4 parts (0.074 mol) of Koch acid (1-naphthylamine-3,6,8-trisulfonic acid) were employed in lieu of the R salt therein mentioned. The results were essentially the same.

Example 8

The procedure was as in Example 6, except that here a mixture of 19.6 parts of H acid (0.061 mol) and 19.6 parts of Chicago acid (1-amino-8-naphthol-2,4-disulfonic acid; 0.061 mol) was employed in lieu of the R salt therein mentioned. The results were essentially the same.

Example 9

*Part A.*—73 parts of victoria blue B (0.144 mol) were dissolved in 1800 parts of water at 80°–85° C. and cooled to 25° C. 20 parts of H acid (0.063 mol) were slurried with 200 parts of water. The dye solution was added to the said slurry during 20–30 minutes at 25°–30° C. The precipitated color was filtered off and dried in vacuum at 80°–85° C.

*Part B.*—74 parts of methyl violet (0.188 mol) were dissolved in 1800 parts of water at 80°–85° C. and cooled to 25° C. 30 parts of H acid (0.094 mol) were slurried with 300 parts of water. The dye solution was added to the acid slurry during 20–30 minutes, at 25° C. The precipitated color was filtered off and dried in vacuum at 80°–85° C.

*Part C.*—126 parts of crystal violet (0.308 mol) were dissolved in 4600 parts of water at 80°–85° C. and the solution was cooled to 25° C. 49 parts of H acid (0.154 mol) were slurried with 425 parts of water. The dye solution was added to the acid slurry during 20–30 minutes, at 25° C. The precipitated color was filtered off and dried in vacuum at 80°–85° C.

*Part D.*—One part of the victoria blue salt from Part A, one part of the methyl violet salt from Part B, and three parts of the crystal violet salt from Part C were mixed together and tested on carbon paper as described in Example 1. The carbon paper made from this mixture was essentially the same in water bleeding and spirit duplication properties as the product obtained in Example 1.

It will be understood that the details of the above examples may be varied widely, without departing from the spirit of this invention. Thus, in lieu of the three basic dyes specified in the examples above, any other combination of three or more basic dyes named in the above table may be employed, in varying quantities, so long as their total in mols adds up roughly to the total in mols indicated in the examples above. By "roughly" I mean that this total, in mols, may vary from the theoretical up to the point where the naphthalene sulfonic acid compound is about 20% below its theory for complete reaction. This is illustrated in Example 5.

In lieu of a single naphthalene-sulfonic acid compound, a mixture of two or more different acids from the table above may be employed, so long as their total in SO₃H-equivalents adds up to the theoretical quantity or to the quantity preferred in a particular case (i. e., from 80% of theory to an optional excess over theory). This is illustrated in Example 8.

In lieu of the free naphthalene-sulfonic acid compound, an alkali-metal salt thereof may be employed, for instance the sodium or potassium salt. This is illustrated in Examples 2, 4, 5 and 6.

The temperature of reaction may be anywhere between 10° and 50° C.

Mixing of the desired salts may be achieved by co-precipitation, as in Examples 1 to 8 inclusive; by separate precipitation followed by mechanical mixing, as in Example 9; or by any intermediate combination of such procedures.

Numerous other variations in detail will be readily apparent to those skilled in this art.

It will be understood that the term "hectographing" throughout this specification is used as a readily-recognizable typical illustration of multigraphing or duplicating processes, without any intent to limit the discussion or to any particular modification of such processes or to any particular number of copies to be produced.

I claim as my invention:

1. A coloring composition adapted for use in duplicating inks, said coloring composition comprising a plurality of essentially water-insoluble, alcohol-soluble salts of different basic dyes, said basic dyes being selected from the group consisting of the triarylmethanes, rhodamines and safranines and said salts being those obtained by reacting said basic dyes with at least one naphthalene-sulfonic acid compound selected from the group consisting of the naphthalene-di- and tri-sulfonic acids, their hydroxy, amino and amino-hydroxy derivatives and the alkali-metal salts of any of these.

2. A coloring composition adapted for use in duplicating inks, said coloring composition comprising a plurality of essentially water-insoluble, alcohol-soluble salts of different triarylmethane basic dyes, said salts being those obtained by reacting said basic dyes with at least one naphthalene-sulfonic acid compound selected from the group consisting of the naphthalene-di- and tri-sulfonic acids, their hydroxy, amino and amino-hydroxy derivatives and the alkali-metal salts of any of these.

3. A coloring composition as in claim 2, said different triarylmethane basic dyes being crystal violet, methyl violet and victoria blue.

4. A coloring composition adapted for use in duplicating inks, said coloring composition comprising an intimate mixture of the essentially water-insoluble, alcohol-soluble salts obtained by joint precipitation of crystal violet, methyl violet and victoria blue B from an aqueous solution thereof by the aid of 1-naphthylamine-3,8-di(sodium-sulfonate).

5. The process of producing a coloring composition adapted for use in duplicating inks, which comprises precipitating jointly from aqueous solution a plurality of salts of basic dyes selected from the group consisting of the triarylmethanes, rhodamines and safranines, by reacting the hydrochlorides of said basic dyes, in aqueous solution, with an aqueous mass comprising at least one naphthalene-sulfonic acid compound selected from the group consisting of the naphthalene di- and tri-sulfonic acids, their hydroxy, amino and amino-hydroxy derivatives and the alkali-metal salts of any of these.

6. A process as in claim 5, wherein the quantity of naphthalene-sulfonic acid compound employed is less than 100% but not less than 80% of the quantity stoichiometrically equivalent to the quantity of basic dyes in said solution.

7. A duplicating ink comprising a duplicating ink vehicle and a coloring composition as defined in claim 1.

References Cited in the file of this patent

UNITED STATES PATENTS

| | | |
|---|---|---|
| 1,841,876 | Buc | Jan. 19, 1932 |
| 2,135,735 | Schwabe | Nov. 8, 1938 |
| 2,392,657 | Goepfert | Jan. 8, 1946 |
| 2,415,827 | Lee | Feb. 18, 1947 |
| 2,492,163 | Locke | Dec. 27, 1949 |
| 2,586,570 | Skiles | Feb. 19, 1952 |